United States Patent Office 2,887,722
Patented May 26, 1959

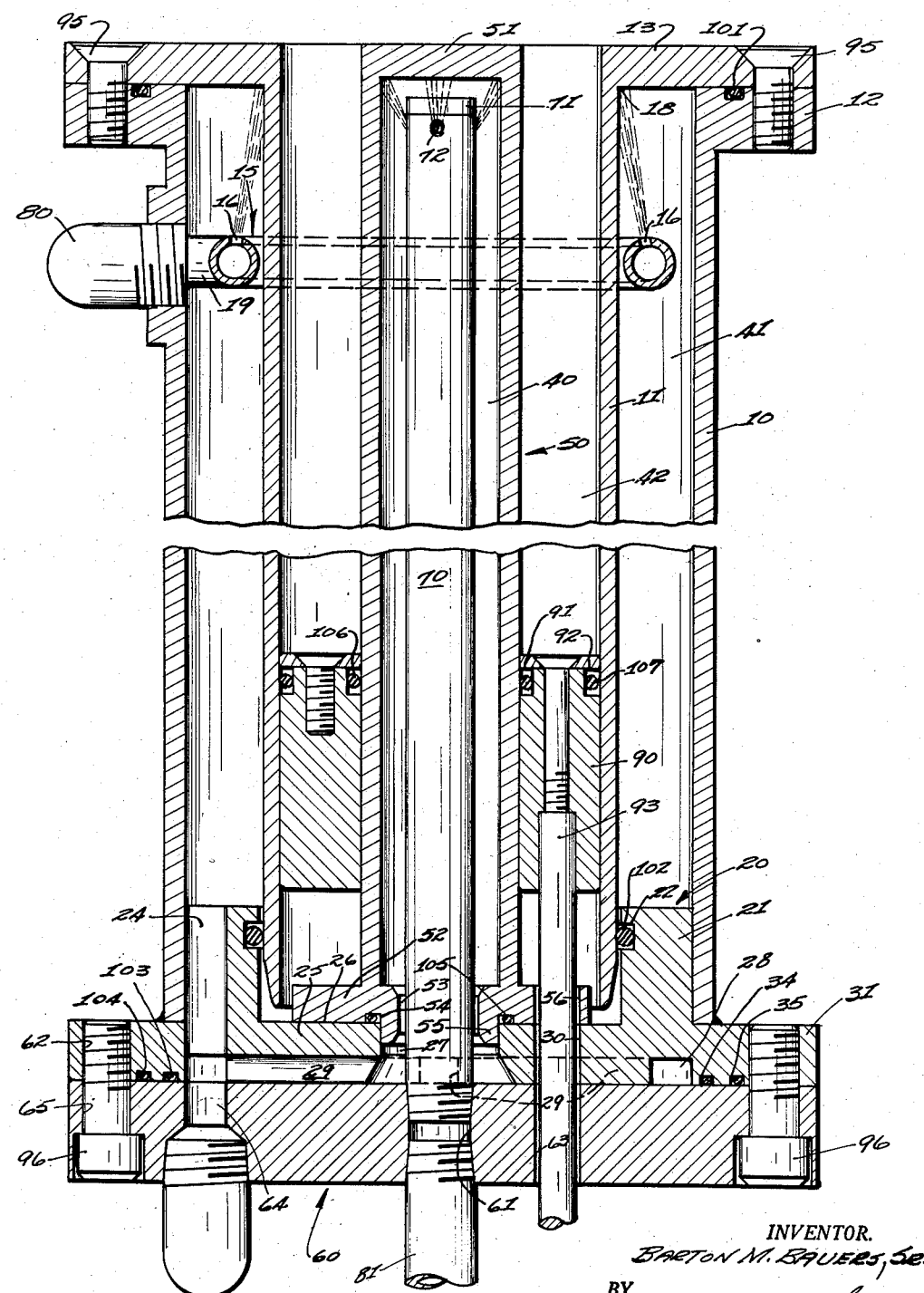

2,887,722
FLUID HEAT EXCHANGE APPARATUS FOR USE IN MOLDS

Barton M. Bauers, Sr., Berlin, N.J., assignor, by mesne assignments, to Owens-Corning Fiberglas Corporation, a corporation of Delaware Application December 19, 1955, Serial No. 553,764

1 Claim. (Cl. 18—39)

This invention relates to a fluid type heat exchange apparatus designed to promote equalized heating or cooling throughout an annular heating chamber.

It is the practice in the manufacture of preformed insulating materials, such as are produced from mixtures of calcareous and siliceous materials, to initially prepare a slurry comprising these materials, and in some instances incorporate into the slurry a measured amount of a fibrous material such as asbestos. Generally, the slurry is then heated in order to accelerate the reaction of the reactant calcareous and siliceous materials into a gell-like structure which, upon continued application of heat under proper conditions, will transform into an integrated microporous structure. However, in the production of these preformed insulating structures the application of heat must be uniformly applied to the slurry once the integration of the materials begins to take place. Failure to uniformly heat the slurry will oftentimes produce transitional movements of the slurry, which, if occurring during the integrating process, will produce cracks in the resultant material which adversely affect the insulating value of the resultant product, and in some instances cause actual breakage of the insulating material so formed.

Furthermore, it has become common practice to form these insulating materials in vertical molds in order to eliminate many of the problems previously encountered in the use of horizontal pan-molds. These vertical molds are generally enclosed within a substantially larger vertical heating chamber to allow sufficient space between the mold and heating chamber for circulation of a fluid heating medium therein. However, considerable difficulty has arisen with the use of vertical molds due to non-uniform heating of the enclosed mold when fluid heating mediums such as steam are employed. It has been found that one of the primary factors contributing to this non-uniform heating is the entrapment of air in pockets within the upper portions of the heating chamber. These entrapped air-pockets prevent effective circulation of the fluid heating medium about the upper portions of the mold and, due to the very low thermal transmission of stationary air, cause the mold walls to be non-uniformly heated.

Therefore, it is an object of this invention to provide an improved fluid type heat transfer apparatus which will effectively eliminate the entrapment of large air pockets within annular heating chambers such as those employed in conjunction with vertical molding of insulating materials.

Another object of this invention is to provide a fluid type heat transfer apparatus which will promote uniform heating of the entire exterior surface of a vertical mold when enclosed within a substantially larger heating chamber.

Still another object of this invention is to provide an economical fluid type heat transfer apparatus having a simple structure adaptable for use within most of the systems presently utilized in the vertical molding of siliceous insulating materials.

With the use of this invention the aforementioned objects are attainable and constitute the principal advantages thereof.

The specific nature of this invention, as well as other objects and advantages thereof, will become apparent to those skilled in the art from the following detailed description, taken in conjunction with the annexed drawing on which, by way of preferred example only, is illustrated the preferred embodiment of this invention.

The accompanying drawing is a central vertical sectional view showing an improved fluid type heat transfer apparatus embodying this invention.

In accordance with this invention there is provided an annular heating chamber comprising a vertical annular outer wall 10 positioned in surrounding relationship to a vertical annular inner wall 11 to thereby define an annular outer heating space 41 between the said walls. Both the inner wall 11 and the outer wall 10 have horizontally disposed radial top flanges 13 and 12, respectively, extending outwardly from the upper ends of the walls. The inner wall top flange 13 is so located that it will seat upon the outer wall top flange 12 and thereby close off the upper end of the annular outer heating space 41. Preferably, a gasket ring 101 is provided for insertion between the adjacent matching surfaces of the said top flanges. Additionally, the top flanges 12 and 13 are provided with mutual top fastening means 95 to promote a better seal between the top flanges and to maintain the proper correlative position of the inner wall 11 with respect to the outer wall 10.

An annular conduit 15 having a plurality of peripherally spaced openings 16 having axes directed radially inward and upward is insertable in the annular outer heating space 41 at a location substantially below the inner wall top flange 13. This location is selected so that the axes of the openings 16 are substantially in alignment with the juncture 18 formed between the inner wall 11 and the top flange 13. The annular conduit 15 is further provided with a laterally extending open end portion 19 which is adapted to receive a pressurized heating fluid, preferably hot water or steam, but not necessarily restricted thereto, which may be provided from a supply conduit 80 traversing the outer wall 10.

The outer wall 10 is provided on its lower end with an annular T-shaped base 20 having a stem portion 21 adjoining the outer wall 10 and extending inwardly therefrom to substantially close the bottom end of the annular outer heating space 41. The stem portion 21 defines in its inwardly facing side an annular groove 22 adapted to snugly receive a resilient annular sealing ring 102 tensionally surrounding the outer surface of the inner wall 11, to thereby seal off the bottom end of the annular outer heating space 41, and substantially prevent leakage of heating fluid between the stem portion 21 and the inner wall 11. Additionally, in the outer edge of the stem portion there is defined at least one vertical outer drain opening 24, extending through the annular T-shaped base 20, through which heating fluid may be discharged from the bottom end of the outer annular heating space 41.

The T-shaped base 20 also comprises an inwardly extending radial positioning block 25 having a top seating surface 26 and a partially tapered vertical bore 27 extending through the center thereof. The bottom surface of the T-shaped base 20 defines an annular drain slot 28 positioned in surrounding relationship to the partially tapered vertical bore 27 and communicating with the outer drain opening 24. The radial positioning block 25 further defines a series of spaced radial drain slots 29 connecting the annular drain slot 28 with the partially tapered vertical bore 27, to thereby form a series of interconnecting drain passages. Between the annular drain slot 28 and the partially tapered vertical bore 27 the radial positioning block 25 defines a plurality of marginally spaced vertical pilot holes 30 spaced intermediately of the radial drain slots 29 and in surrounding relationship to the partially tapered vertical bore 27.

Oppositely disposed from the radial positioning block 25, the annular T-shaped base 20 is provided with a horizontally disposed radial bottom flange 31 defining a plurality of marginally spaced bottom flange apertures 62 adapted to receive a like number of fastening means, such as bolts 96. Inwardly of the bottom flange apertures 62, the radial bottom flange 31 also defines a series of circumbasal channels 34 and 35 which are adapted to snugly receive resilient annular sealing rings 103 and 104 respectively, therein.

Additionally, there is provided an axially vertical hollow core 50 which is axially insertable within the inner wall 11 and which is provided with a closed upper end portion 51 and an annular support 52 horizontally disposed from its lower end portion. The annular support 52 defines a vertical centrally located beveled drain hole 53 and a circumbasal notch 54 in surrounding relationship thereto. Between the circumbasal notch 54 and the beveled drain hole 53 the annular support 52 is provided with an integral depending annular lug 55 which is snugly insertable within the vertical bore 27 in the positioning block 25. Additionally, the bottom surface of the annular support 52 is adapted to seat upon the top seating surface 26 of the positioning block 25. The annular support 52 further defines a plurality of annular support pilot holes 56 adapted to register in axial alignment with the positioning block pilot holes 30 when the annular support 52 is properly seated upon the positioning block 25. When the annular support 52 is so seated upon the positioning block 25 a resilient sealing ring 105 is compressed within the circumbasal notch 54 to substantially prevent leakage of fluid between the positioning block 25 and the annular support 52. Additionally, when the annular support 52 is seated properly upon the positioning block 25 the hollow core 50 cooperates with the inner wall 11 to define an annular mold cavity 42 therebetween, into which the material to be molded may be introduced.

An end flange 60 defines a centrally positioned fluid inlet opening 61 extending therethrough which is adapted for detachable securement to a vertical conduit 70 and an external conduit 81 supplying heating fluid thereto. The end flange 60 is also provided with a plurality of marginally spaced apertures 65 positioned to register in axial alignment with the bottom flange apertures 62 which are adapted for securement thereto by fastening means 96. Additionally, the end flange 60 defines a plurality of vertical pilot holes 63 adapted to register with the positioning block pilot holes 30, and an outlet opening 64 adapted to register with the annular drain slot 28 in the positioning block 25.

The vertical conduit 70 extending upwardly from the end flange 60 is insertable within the hollow core 50 by passing it axially upward through the beveled drain hole 53 in the annular support 52. When so inserted, the vertical conduit 70 cooperates with the circumambient hollow core 50 to define an annular inner heating space 40 therebetween. When the vertical conduit 70 is so inserted it defines a plurality of equally spaced circumferential openings 72, adjacent to a closed upper end portion 71, which are directed radially outward toward the upper end portion 51 of the hollow core 50.

An annular piston ring 90 which is axially insertable within the annular mold cavity 42 defines an inner peripheral slot 91 and an outer peripheral slot 92 substantially near the top surface thereof. The inner slot 91 and the outer slot 92 are each adapted to receive a tight-fitting resilient sealing ring 106 and 107 respectively therein, to provide a movable seal between both the piston ring 90 and the inner wall 11, and the piston ring 90 and the hollow core 50. Depending from the bottom surface of the piston ring 90 there is provided a plurality of detachably secured, peripherally spaced piston rods 93. These piston rods 93 extend downward through the aligned pilot holes 56, 30, and 63, in the annular support 52, the radial positioning block 25, and the end flange 60 respectively, and are detachably connected at their bottom end to conventional means (not shown on the drawing) for supplying intermittent reciprocal axial motion to the piston rods 93. By connecting the piston rods 93 to such conventional means the annular piston ring 90 may be moved axially up and down within the annular mold cavity 42 for cyclic filling thereof and also the extrusion of material therefrom.

When pressurized heating fluid from the supply conduit 80 is introduced into the annular conduit 15, it is distributed throughout the annular conduit 15 and discharged under pressure through the radial peripherally spaced openings 16, therein, to impinge upon the juncture 18 formed between the inner wall 11 and the top flange 13 extending outwardly therefrom. At the same time pressurized heating fluid provided by the supply conduit 81 may be introduced into the vertical conduit 70 and be discharged radially outward through the equally spaced circumferential openings 72 axially toward the juncture between the upper end portion of the hollow core 50 and the closed end portion 51 thereof. Preferably, the supply conduits 80 and 81 of the heating fluid are connected externally of the fluid type heat transfer apparatus to thereby promote equalized conditions between the heating fluid in each of the supply conduits 80 and 81 before it enters the inner and outer heating spaces 40 and 41.

If a gaseous heating fluid, preferably steam, is used it will be discharged from the radial peripherally spaced openings 16 and be directed radially upward toward the juncture 18 between the inner wall 11 and the flanged top end portion 13 thereof, fill the upper end of the annular outer heating space 41, and expand outwardly thereby forcing the air within the annular outer heating space 41 downward and out through the outer drain opening 24. Discharge of the gaseous heating fluid may be continued in this manner until the annular outer heating space 41 is completely filled with the heating fluid and substantially all of the air has been purged through the outer drain opening 24. After the air has been purged from the annular outer heating space 41 in this manner, a nearly complete distribution of the gaseous heating fluid therein is possible, and likewise an equalized heating throughout the annular outer heating space 41 may be attained.

In like manner if a gaseous heating fluid, preferably steam, is used in heating the inner heating space 40 it will be discharged from the circumferential openings 72 toward the juncture between the hollow core 50 and its closed upper end portion 51 to thereby fill the inner heating space 40 from the top and force substantially all air therein through the beveled drain hole 53 communicating with the interconnecting drain passages 28, 29, and 24 extending through the positioning block 25. Thus, the inner heating space 40 may also be purged of substantially all air to thereby promote a more uniform distribution of the gaseous heating medium therein and consequently a more equalized heating of the hollow core 50.

However, this invention is also adaptable for use with a liquid heating fluid. When a liquid heating fluid is employed in the annular conduit 15 the liquid will impinge upon the juncture 18 formed between the inner wall 11 and the flanged top end portion 13 thereof, and proceed down the inner wall 11 in an evenly distributed flow. Upon reaching the lower end of the annular outer heating space 41 the liquid will be discharged through the outer drain opening 24 and outlet opening 64 communicating therewith. Similarly, when a liquid heating fluid is introduced into the vertical conduit 70 it will impinge upon the upper end portion 51 of the hollow core 50, flow evenly distributed down the surface thereof, and be discharged through the series of interconnecting drain passages communicating with the outlet opening 64.

Furthermore, it is anticipated that it may be desirable to connect the outlet opening 64 to a recirculating system whereby the heating fluid may be recirculated back through the annular conduit 15 and the vertical conduit 70, to thereby conserve both heat and fluid.

Additionally, it is understood that this invention may also be used for cooling the heating spaces 40 and 41 by simply introducing a cooling fluid into the annular conduit 15 and the vertical conduit 70, respectively.

It will, of course, be understood that various details of construction may be modified through a wide range without departing from the principles of this invention, and it is, therefore, not the purpose to limit the patent granted hereon otherwise than as necessitated by the scope of the appended claim.

I claim:

In combination with an axially vertical mold for molding slurries of calcareous and siliceous materials and provided with means defining an axially vertical outer wall surrounding said mold in spaced concentric relationship and defining therewith an annular heating chamber between said wall and said mold and means engaging said mold and closing the upper end of said heating chamber, an improved heating means for said heating chamber, said heating means comprising a heat directing dispersion ring having an annular body portion disposed within said heating chamber in spaced concentric relationship with said mold and said outer wall and encircling said mold at a location substantially below said heating chamber closing means, said annular body portion being provided with a plurality of closely spaced peripheral openings having axes directed radially inward and upward at a common angular inclination and in substantially linear alignment with the juncture formed between said chamber closing means and said mold, said dispersion ring also having an integral inlet end extending laterally from said annular body portion, a pressurized heating fluid supply conduit traversing said outer wall and communicating with said inlet end of said dispersion ring, and a discharge outlet for said heating fluid being provided at the lower end of said heating chamber.

References Cited in the file of this patent

UNITED STATES PATENTS

| | | |
|---|---|---|
| 958,892 | Riddell | May 24, 1910 |
| 1,551,277 | York | Aug. 25, 1925 |
| 2,517,001 | Lewon et al. | Aug. 1, 1950 |
| 2,646,601 | Jung | July 28, 1953 |
| 2,763,042 | Zupez | Sept. 18, 1956 |